United States Patent

Baker

[15] 3,644,904

[45] Feb. 22, 1972

[54] CHIP SELECT CIRCUIT FOR MULTICHIP RANDOM ACCESS MEMORY

[72] Inventor: Lamar T. Baker, Hauppage, N.Y.

[73] Assignee: General Instrument Corporation, Newark, N.J.

[22] Filed: Nov. 12, 1969

[21] Appl. No.: 875,925

[52] U.S. Cl. ..........................340/173 R, 307/238, 307/279, 340/173 AM, 340/173 FF

[51] Int. Cl. ..........................G11c 11/40

[58] Field of Search ................340/173 AM, 173 FF, 173 SS; 307/238, 279

[56] References Cited

UNITED STATES PATENTS

| | | | |
|---|---|---|---|
| 3,483,528 | 12/1969 | Koerner | 340/166 |
| 3,518,635 | 6/1970 | Cole | 340/173 |

*Primary Examiner*—Terrell W. Fears
*Attorney*—James & Franklin

[57] ABSTRACT

A random access read-write memory comprises memory sections formed on a plurality of chips. The decoding of the chip select signal inhibits the write command signal from all but the selected chip, thereby permitting new data to be written only at the selected chip.

9 Claims, 3 Drawing Figures

INVENTOR
LAMAR T. BAKER
BY
Sandoe, Hopgood & Calimafde
ATTORNEYS

INVENTOR
LAMAR T. BAKER
BY
Sandoe, Hopgood & Calimafde
ATTORNEYS

CHIP SELECT CIRCUIT FOR MULTICHIP RANDOM ACCESS MEMORY

The present invention relates generally to random access, read-write memories, and particularly to such a memory comprising a plurality of memory units or chips.

Read-write memories are basic components of almost all digital computers. In these memories, data, usually in binary form, is stored at a plurality of address stations, commonly defined at the intersections of rows and columns. In a random access memory, data at a particular address station may be read out by addressing that station. For a write operation to be performed on the memory at a desired address station, the memory is addressed and a write command, along with the new data signal, is supplied to the memory in a manner causing the new data signal to be stored at the selected address station.

A recent significant development in the fabrication of read-write memories is the formation of such memories in integrated circuit form, in which field-effect transistors (FET's) are formed to serve as the data-storing and control elements. Memories fabricated in this manner are desirable for use in computers in that they permit a great quantity of data to be stored in a relatively small volume, and moreover, the access time to the stored data is shortened due to the fast switching time available through the use of FET's.

Integrated circuit memories of this type are commonly formed on semiconductor wafers or chips on which the FET's are formed by appropriate fabrication techniques. The number of address stations that can be formed on each chip is, however, limited by practical considerations in chip design and fabrication since a minimum chip area is required for the formation of each FET utilized in the formation of the data-storage and address-decoding circuitry. Increasing the size of the chip itself creates new problems in fabrication, and the provision of increased numbers of address stations on an individual chip tends to complicate the address-decoding circuitry.

To increase the data-storage capacity of the memory without increasing individual chip dimensions and capacity, that is, to increase the number of bits of data that can be stored in the memory at a given time, the memory is formed of a plurality of such individual chips. The addressing or decoding circuitry then further includes a chip select decoder which processes suitable input chip select data and produces form that data a chip select signal. That signal, along with the more conventional row and column select signals, comprises the address signal for a particular read or write operation, by specifying the address station-row-column intersection on a selected one of the memory constituent chips.

In the conventional multichip memories of this type, the chip select signal is employed to inhibit either the row of column select signal from all but the selected chip, thereby to limit the desired read or write operation to only that selected chip. This has created two significant operational problems, the solution to which has thus far eluded the art.

The first of these problems stems from the fact that the output signal from each chip decoder, only one of which is the unique chip select signal, must be connected to each of the column (or row) decoders. In a typical memory in which each chip may have 32 data-storage columns, the chip select decoder is connected to each of the 32 column decoders on its associated chip. This creates a relatively large capacitive load on the chip decoder which tends to reduce the output signal magnitudes. As a result, great care must be exercized to ensure that chip select signals of proper levels are produced by the known chip select decoder even with the large amount of capacitive loading on the decoder.

Moreover, in memories of this type in which two-phase or four-phase logic timing signals are used to control the timing and switching functions of the addressing circuitry, it is common for the chip select and column select signals to be derived during a common clock phase during each cycle of memory operation. This creates the problem of "racing" between the various decoding circuits, since to ensure the proper operation of the column (or row) decoder, the appropriate chip select signal must be derived and stabilized within a sufficiently short time to permit the formation of the column (or row) select signal within the remaining time in the appropriate clock phase. In the design and fabrication of the known chip and column decoding circuitry, it is difficult to ensure that the devices in the chip decoder discharge at a sufficiently rapid rate to ensure that the column decoder, which in the known memories utilizes the chip select signal, develops the column select signal within the desired clock phase.

It is an object of the present invention to provide a multichip random access, read-write memory having a simplified and more effective method for achieving chip selection during memory addressing.

It is a further object of the present invention to provide a multichip memory of the type described in which the loading on the chip select decoder is significantly reduced and in which the relative timing of the chip decoding circuitry is not critical with respect to either row or column decoding.

To these ends the memory of the present invention comprises memory sections formed on a plurality of chips. The decoding of the chip select signal inhibits the write command signal from all but the selected chip, thereby permitting new data to be written only at the selected chip.

To the accomplishment of the above and to such further objects as may hereinafter appear, the present invention relates to a random access, read-write memory as defined in the appended claims and as described in the following specification, taken in conjunction with the drawings, in which:

The read-write memory of the present invention comprises a plurality of memory units or chips at which data is stored at a plurality of address stations, which may be advantageously defined by a plurality of intersecting rows and columns defined on each memory unit. To address a particular address station in the memory for the purpose of reading stored data form or writing new data into that address station, row and column select signals are derived by appropriate decoding circuitry and a chip select signal is similarly derived. The combination of the row, column and chip select signals is effective to locate the desired address station in the memory. The memory of the present invention includes means for utilizing the chip select signal to inhibit the writing of new data into all but the desired address station, that is, the selected address station on the selected chip.

Figure 3:
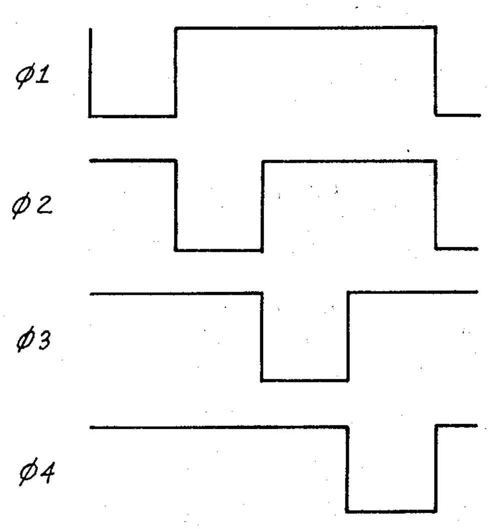
FIG. 3 is a timing waveform diagram of the four-phase clock signals used to control the operation of the memory.

The operation of the memory is controlled by sequential, four-phase clock phases 01, 02, 03 and 04, for which the timing relationship is shown in the waveform diagram of FIG. 3. In the following discussion, the "time" of a particular clock phase is that period of a clock cycle in which that clock phase is negative. Thus 02 time, for example, is that period in which the clock phase 02 is negative.

Figure 1:
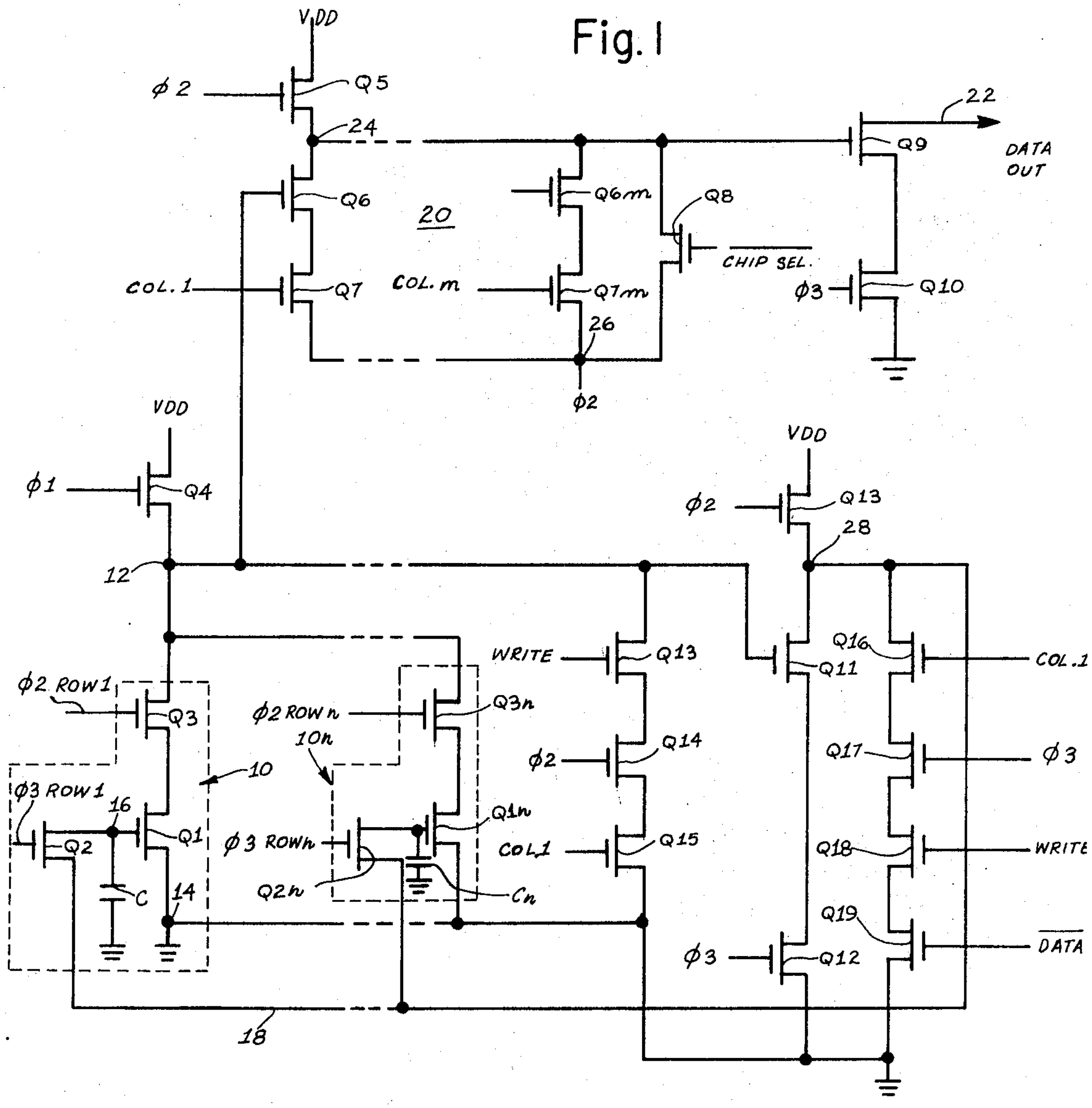
FIG. 1 is a schematic circuit diagram of the data-storing data refreshing, and data readout portions of the memory of the present invention.

Referring first to FIG. 1, a data-storing address station generally designated 10 is, as herein described, defined by a three FET circuit. In FIG. 1, address station 10 is located at the intersection of row 1 and column 1, it being understood that all address stations (as indicated by station 10*n* for which the components corresponding to those in address station 10 bear similar reference numerals followed by the suffix "*n*") on all chips are similarly formed. Address station 10 comprises FET's Q1, Q2 and Q3. The source-drain output circuit of FET Q1 is connected in series with the output circuit of FET Q3 between a data output point 12 and ground at point 14. The gate of FET Q1 has connected thereto at point 16 a data storage capacitor C on which the data signal for address station 10 is stored at one of two levels corresponding respectively to the logic "1" or logic "0" binary signals. As herein described, a logic "1" signal is defined by a negative signal on capacitor C while a logic "0" signal is defined by a positive or ground level signal on that capacitor.

Point 16 is also connected to one terminal of the output circuit of FET Q2. The other terminal of FET Q2 is connected to a data-refresh line 18 the function of which is more completely described in a later part of this specification.

The gates of FET's Q2 and Q3 each receive row select signals derived by row decoder circuitry (not shown) which process input row select signals to form a uniquely negative row select signal for the selected row. As herein shown, a 02 row 1 signal applied to the gate of FET Q3, and a 03 row 1 signal applied to the gate of FET Q2, are derived from the row 1 select signal, by respectively deriving the time-coincident signals of clock phases 02 and 03 and the row 1 select signal. The circuitry for deriving these signals is well known to those skilled in the memory art and no further description of these circuits is provided herein.

The presence of a uniquely negative row 1 select signal is effective to address all address stations such as address station 10 located in row 1 on all memory chips. Thus, if a negative (logic "1") signal is stored at capacitor C, FET Q1 is conductive. During 02 time, the 02 row 1 signal is negative, which in turn renders FET Q3 conductive. This causes point 12, which is precharged negative during 01 time through the then conducting circuit of FET Q4, to be connected to ground at point 14 through the series-connected conducting output circuits of FET's Q1 and Q3. If the signal on capacitor C is positive or ground (logic "0"), FET Q1 remains nonconductive and point 12 retains its precharged negative level. The signal at point 12 is thus the complement of the stored data signal on capacitor C. That signal is applied to a readout circuit generally designated 20, which produces at output node 22 a data out signal corresponding to the stored data signal at capacitor C of address station 10.

Readout circuit 20 comprises series-connected FET's Q5, Q6 and Q7. A point 24 is defined at the junction of the output circuits of FET's Q5 and Q6 and the output circuits of FET's Q6 and Q7 are connected in series between point 24 and a point 26 connected to the 02 clock phase, point 26 being at ground at all times other than 02 time. The gate of FET Q6 receives the inverted data signal from point 12, and the gate of FET Q7 receives the column 1 select signal, which is uniquely negative for an address selection at column 1. (The column decode circuitry for deriving the column select signal may be similar to the row select decode circuit and is similarly not further described herein.) FET's Q6*m* and Q7*m* are provided for addressing at column *m*, and are connected in parallel with FET's Q6 and Q7 between points 24 and 26. FET Q8 is also connected between points 24 and 26 and receives the inverse of the chip select signal at its gate.

Point 24 is connected to the gate of an output FET Q9, the output circuit of which is connected in series with that of FET Q10 between output node 22 and ground. FET Q10 has the 03 clock phase applied to its gate.

In operation for a negative signal at point 12, corresponding to a stored logic "0" signal, FET Q6 is turned on, and for a column 1 address, point 24 is connected to ground through the output circuits of FET's Q6 and Q7. FET Q9 is thus rendered nonconductive so that an open circuit appears at node 22. For a ground signal at point 12, corresponding to a logic "1" data signal stored on capacitor C, FET Q6 is nonconductive, so that point 24 remains negative, FET Q9 is turned on, and note 22, during 03 time when FET Q10 is on, is connected to ground.

For all unselected chips, the $\overline{\text{chip select}}$ signal is negative and for those chips FET Q8 is turned on, unconditionally connecting point 24 to ground, thus producing an open circuit at the output node 22 of all unselected chips as desired.

During a read operation, it is desired to maintain or refresh the readout level at the capacitor C in the selected address station. To this end, point 12 is connected to the gate of FET Q11, the output circuit of which is connected between a point 28 and ground through the output circuit of FET 12, the latter receiving the 03 clock phase at its gate. Point 28 is precharged negative during 02 time through FET Q13 and is connected by line 18 to the gate of FET Q2. When the inverted signal at point 12 is negative, FET Q11 is connected to ground, and during 03 time, during which FET Q2 is on, the ground signal is restored to capacitor C. Similarly, if the signal at point 12 is ground, FET Q11 is nonconductive, and point 28 retains its negative level, which in turn is transferred during 03 time to capacitor C, thereby to restore that capacitor to its initial negative, logic "1" charge.

During a write operation, in which a new data level is to be applied to capacitor C in the selected address station, it is desired to inhibit the refreshing operation at the selected address station. For this reason, FET's Q13, Q14 and Q15 are connected in series between point 12 and ground and respectively receive the write command, the 02 clock phase, and the column select signal at their gates. When each of these signals is present, i.e., negative, each of these FET's is conductive, so that point 12 is unconditionally tied to ground during 02 time. This causes an unconditional ground level to appear at node 22 during 03 time. Moreover, FET's Q16, Q17, Q18 and Q19 are connected in series between point 28 and ground, and receive at their gates the column select, the 03 clock phase, the write command, and the complement of the data signal, respectively. The latter two signals applied to FET's Q18 and Q19 allow these FET's to be discharged to ground independent of the 03 clock phase, which provides improved reliability and speed of a write operation.

If the data signal to be supplied to capacitor C is a logic "1", the $\overline{\text{data}}$ signal is ground, FET Q19 is off, and point 28 remains negative. As a result, during 03 time, a negative signal, as desired, is applied to capacitor C through FET Q2. Conversely for a logic "0" signal, the $\overline{\text{data}}$ signal is negative, FET Q19, along with FET's Q16–Q18 during 03 time, is conductive, so that point 28 is connected to ground during 03 time. That ground level thus is "written" on capacitor C through FET Q2 at that time.

Figure 2:
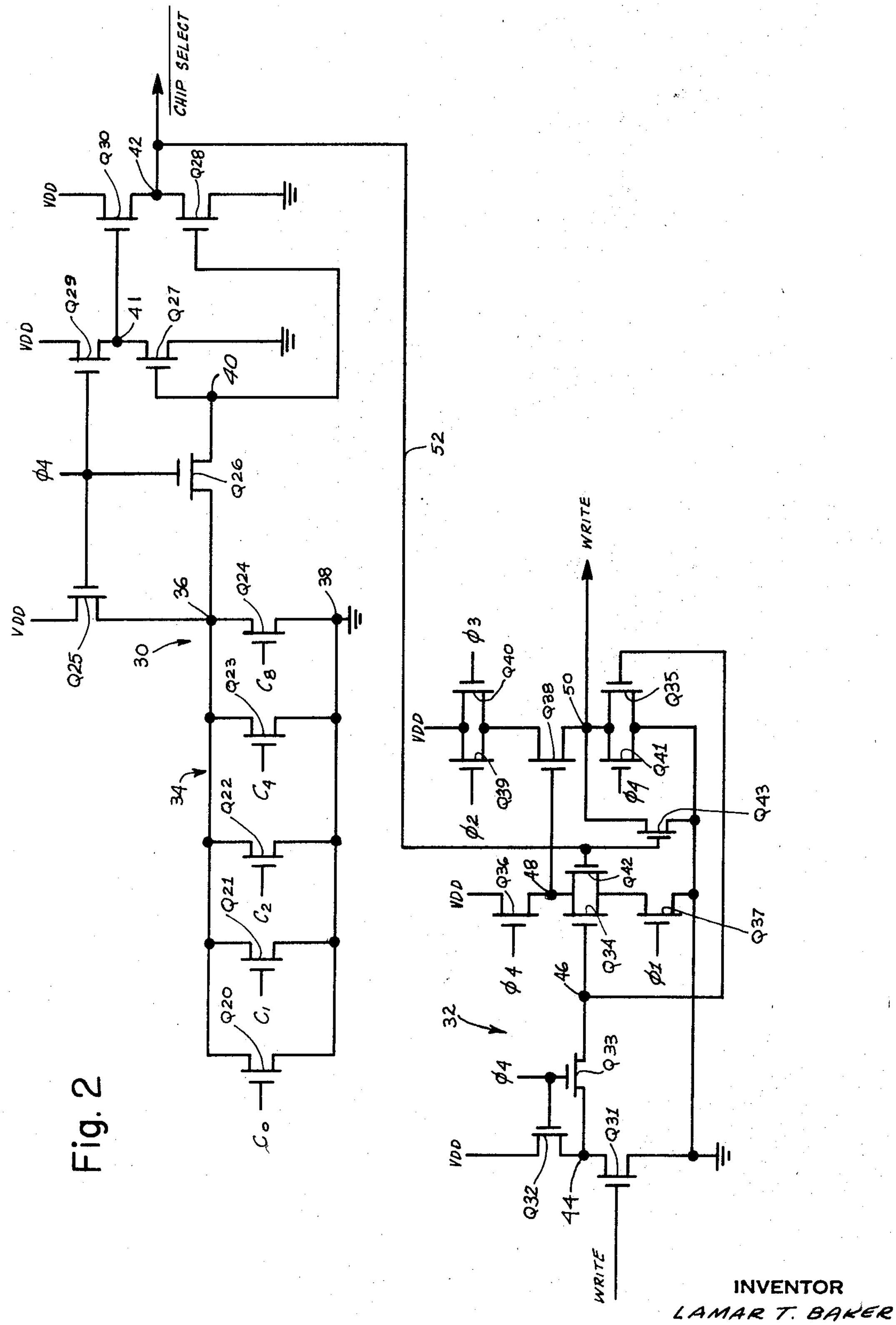
FIG. 2 is a schematic circuit diagram of the chip select decoding and write signal command circuit of the read-write memory of the present invention.

FIG. 2 illustrates the chip select decoder 30 and the write command circuit 32. As stated above, in the memory of the present invention, the chip select signal inhibits the write command signal from all but the selected chip. Circuit 30 comprises a NOR-gate 34 which comprises in parallel FET's Q20–Q24 connected between a point 36, which is precharged negative during 04 time through FET Q25, and ground at point 38.

FET's Q20–Q24 receive the input chip select signals C0, C1, C2, C4 and C9 (for a 32 chip memory) and/or their complements in one of the 32 permutations of these signals. For the selected chip only, each of FET's Q20–Q24 receives a ground signal at its gate so that no conduction path is provided between points 36 and 38, the former, as a result, remaining negative. Point 36 is connected through a noninverting level-shifting FET Q26, which is conductive during 04 time, to a point 40 which in turn is connected to the gates of FET's Q27 and Q28. FET Q27 is connected in series with FET Q29 between the negative VDD supply and ground. A point 41, defined between FET's Q27 and Q29 and precharged negative during 04 time, is connected to the gate of FET Q30 which is connected in series with FET Q28, point 42 being defined between these FET's.

For the selected chip, FET's Q27 and Q28 are conductive, so that point 41 is connected to ground through the output circuit of FET Q27. As a result, FET Q30 is nonconductive and point 42, at which the $\overline{\text{chip select}}$ signal is derived, is connected to ground through the output circuit of FET Q28. Conversely, for the nonselected chips, point 36 is at ground, FET's Q27 and Q28 are off, and points 41 and 42 are negative, thereby to produce a negative $\overline{\text{chip select}}$ signal at point 42 as is desired. That signal is applied to the gate of FET 08 in readout circuit 20.

Write command circuit 32 comprises an input FET Q31 which receives the write command signal at its gate. The output circuit of FET Q31 is connected in series between the VDD supply and ground with the output circuit of FET Q32, a point 44 being defined therebetween. That point is precharged negative during 04 time through FET Q32 and is connected through the output circuit of a noninverting, level-shifting FET Q33, during 04 time, to a point 46. Point 46 in turn is connected to the gates of FET's Q34 and Q35.

The former FET has its output circuit connected in series with the output circuits of FET's Q36 and Q37 between the VDD supply and ground. A point 48, precharged negative during 04 time through FET Q36, is defined between FET's Q34 and Q36, and FET Q37 receives the 01 clock phase at its gate. Point 48 is connected to the gate of FET Q38, which in turn has its output circuit connected in series with the parallel connected output circuits of FET's Q39 and Q40, and the output circuit of FET Q41, connected in parallel with the output circuit of FET Q35, between the VDD supply and ground. The gates of FET's Q39, Q40 and Q41 have the 02, 03 and 04 clock phase respectively applied to their gates. A point 50 at which the write command signal is derived is defined at the junction of FET's Q38, Q35 and Q41.

FET Q42 has its output circuit connected in parallel with that of FET Q34, and FET Q43 has its output circuit connected between point 50 and ground. The gates of FET's Q42 and Q43 are tied together and are connected by a line 52 to point 42 at chip select decoder 30.

In operation of circuit 32, a negative input write command turns FET Q31 on, and thus connects point 44 to ground. That ground level is transferred to point 46 and thus to the gates of FET's Q34 and Q35 which are thereby turned off. Assuming that the $\overline{\text{chip select}}$ signal is positive, corresponding to the selected chip, FET's Q42 and Q43 are nonconductive.

Thus, point 48 remains negative, thereby turning FET Q38 on. Since FET Q41 is on only during 04 time, point 50 is charged negative as is desired during 02 and 03 times through FET's Q39 and Q40 respectively.

However, for all nonselected chips, the $\overline{\text{chip select}}$ signal is negative so that FET's Q42 and Q43 are conductive. As a result, point 48 is connected to ground during 01 time through the output circuits of FET's Q42 and Q37, and point 50 is connected to ground through the output circuit of FET Q43. As a result, FET Q38 is off at all time other than 04 time, at which time point 48 is once again charged negative. As a result, point 50, at which the write command signal is to be derived for only the selected chip, is connected to ground for all the unselected chips.

The memory circuit of the present invention thus provides a novel and improved manner of addressing a selected address in a multiunit, or multichip memory. In a typical memory fabricated in accord with this invention, the memory contained 32 chips, each having 512 address stations formed thereon at the respective intersections of 32 columns and 16 rows.

The $\overline{\text{chip select}}$ signal for each chip was connected to only the corresponding write command circuit 32 and to the readout circuit 20 for that chip, as opposed to the at least 32 such connections to each of the column decoding circuits for each chip as required in the prior art memories of this type. Moreover, the chip select timing operation, active as it is on the write command circuit rather than the column decoder, need not be critical with respect to the column decoding operation as in the prior art memories. This permits less exacting techniques in the fabrication of the chip select circuit than was previously required.

While only a single embodiment of the present invention has been herein specifically disclosed, it will be apparent that variations may be made therein without departure from the spirit and scope of the invention.

I claim:

1. A random access read-write memory comprising a plurality of units each having a plurality of address stations at which data is adapted to be stored, means for writing new data into a selected one of said address stations on a selected one of said units, means for selecting said one of said units, and means operatively connected between said data writing means and said unit selecting means for inhibiting the output from said writing means to all said units other than said selected one of said units.

2. The memory of claim 1, in which said units each comprising a chip of semiconductor material, said unit-selecting means comprising means for producing a unique signal for only said selected one of said chips.

3. The memory of claim 2, in which said writing means comprises means for providing a write command signal at a first level at said selected chip, said inhibiting means comprising means for providing a write inhibit signal at a second level different from said first level at the unselected ones of said chips.

4. The memory of claim 3, in which said writing means comprises an output terminal, and a line at said second level, said inhibiting means comprising switch means operatively connected between said output terminal and said line and effective when actuated by an inverse unit select signal derived from said unit selecting means to operatively connect the former to the latter.

5. The memory of claim 4, in which said inhibiting means further comprise second switch means having a control terminal operatively connected to said output terminal, an intermediate point operatively connected to said control terminal, and third switch means effective when actuated by said inverse unit select signal to operatively connect said intermediate point to said line, thereby to establish an inhibit signal at said control terminal.

6. The memory of claim 1, in which said writing means comprises means for providing a write signal at a first level at said selected unit, said inhibiting means comprising means for establishing a signal at a second level different from said first level at the selected ones of said units.

7. The memory of claim 6, in which said writing means comprises an output terminal, and a line at said second level, said inhibiting means comprising switch means operatively connected between said output terminal and said line and effective when actuated by an inverse unit select signal derived from said unit selecting means to operatively connect the former to the latter.

8. The memory of claim 7, in which said inhibiting means further comprises second switch means having a control terminal, an intermediate point operatively connected to said control terminal, and third switch means effective when actuated by said inverse unit select signal to operatively connect said intermediate point to said line, thereby to establish an inhibit signal at said control terminal.

9. The memory of claim 1, further comprising a source of timing signals, a source of address station select signals, a source of data signals, a data storage device at each of said address stations, and means for writing data at a selected one of said address stations, said writing means comprising four switch means operatively connected in series between an input point adapted to be operatively connected to the storage device in said selected address station and a reference point, said switch means each having a control terminal to which are respectively applied one of said address station select signals, one of said timing signals, a write command signal from said writing means, and one of said data signals, the first-mentioned two signals being applied to the control terminals of two of said switch means nearest said input point, said last-two-mentioned signals being applied to the control terminals of the two of said switch means nearest said reference point.

* * * * *